(12) United States Patent
Elorza et al.

(10) Patent No.: US 9,731,973 B2
(45) Date of Patent: Aug. 15, 2017

(54) METHOD FOR OBTAINING GRAPHENE OXIDE

(71) Applicant: Graphenea S.A., Donostia (San Sebastian) (ES)

(72) Inventors: Amaia Zurutuza Elorza, Donostia (ES); Beatriz Alonso Rodriguez, Donostia (ES)

(73) Assignee: GRAPHENEA S.A., Donostia (San Sebastian) (ES)

( * ) Notice: Subject to any disclaimer, the term of this patent is extended or adjusted under 35 U.S.C. 154(b) by 0 days.

(21) Appl. No.: 15/071,541

(22) Filed: Mar. 16, 2016

(65) Prior Publication Data

US 2016/0272499 A1    Sep. 22, 2016

(30) Foreign Application Priority Data

Mar. 17, 2015 (EP) .................................... 15382123

(51) Int. Cl.
    *C01B 31/04* (2006.01)
(52) U.S. Cl.
    CPC ........ *C01B 31/043* (2013.01); *C01B 31/0476* (2013.01)
(58) Field of Classification Search
    CPC . C01B 31/04; C01B 31/0407; C01B 31/0415; C01B 2204/00; C01B 2204/02; C01B 2204/04; C01B 2204/06; C01B 2204/065; C01B 2204/20; C01B 2204/22; C01B 2204/24; C01B 2204/28; C01B 2204/30; C01B 2204/32
    USPC ....................................................... 423/448
    See application file for complete search history.

(56) References Cited

U.S. PATENT DOCUMENTS

| 1,137,373 A | 4/1915 | Alysworth |
| 3,323,869 A | 6/1967 | Olstowski |
| 4,895,713 A * | 1/1990 | Greinke .............. C01B 31/0415 252/502 |
| 4,915,925 A | 4/1990 | Chung |
| 6,596,396 B2 | 7/2003 | Hirata et al. |
| 7,550,529 B2 | 6/2009 | Drzal et al. |
| 7,658,901 B2 | 2/2010 | Prud'Homme et al. |
| 7,824,651 B2 | 11/2010 | Zhamu et al. |
| 8,114,375 B2 | 2/2012 | Jang et al. |
| 8,524,067 B2 | 9/2013 | Zhamu et al. |
| 8,747,623 B2 | 6/2014 | Zhamu et al. |
| 2012/0063988 A1 * | 3/2012 | Tour ....................... B82Y 30/00 423/415.1 |
| 2012/0128570 A1 | 5/2012 | Krishnaiah et al. |
| 2013/0045156 A1 | 2/2013 | Nomoto et al. |
| 2013/0302593 A1 | 11/2013 | Coleman et al. |
| 2014/0079932 A1 * | 3/2014 | Aksay .................... B82Y 30/00 428/219 |
| 2014/0147648 A1 | 5/2014 | Zhamu et al. |

FOREIGN PATENT DOCUMENTS

| GB | 1186727 | 4/1970 |
| WO | 2010042912 A1 | 4/2010 |
| WO | 2014140324 A1 | 9/2014 |
| WO | 2014186452 A1 | 11/2014 |

OTHER PUBLICATIONS

Dreyer, et al., The chemistry of graphene oxide, Chem. Soc. Rev. 2010; 39: 228-240.*
Paton, et al., Scalable production of defect-free few-layer graphene by shear exfoliation in liquids, Nature Materials 2014; 13: 624-630, with Supplementary Information, pp. 1-102 (published online Apr. 20, 2014).*
European Search Report, dated Sep. 2, 2015, for European application 15382123.6.
Daniela C. Marcano, Dmitry V. Kosynkin, Jacob M. Berlin, Alexander Sinitskii, Zhengzong Sun, Alexander Slesarev, Lawrence B. Alemany, Wei Lu and James M. Tour, Improved Synthesis of Graphene Oxide, ACSNANO, 2010, pp. 4806-4814, vol. 4, No. 8, American Chemical Society.

* cited by examiner

*Primary Examiner* — Daniel C McCracken
(74) *Attorney, Agent, or Firm* — Myers Wolin, LLC

(57) ABSTRACT

A method for obtaining graphene oxide is provided comprising the steps of a) adding an acid and a salt to graphite for obtaining a graphite oxide, and b) exfoliating the graphite oxide by mixing it, wherein the steps a) and b) are carried out simultaneously in a high shear mixer.

4 Claims, 7 Drawing Sheets

METHOD FOR OBTAINING GRAPHENE OXIDE

CROSS REFERENCE TO RELATED APPLICATIONS

This application claims priority under 35 USC §119 to European Patent Application No. EP 15382123.6 filed on Mar. 17, 2015, the contents of which are incorporated herein by reference.

FIELD OF THE INVENTION

The present invention relates to carbon nano-structures and also to the manufacture or treatment of nano-structures. Particularly, the present invention relates to methods for obtaining graphene oxide monolayers.

BACKGROUND

Graphene can be synthesized in different forms depending on the manufacturing method and required application. Graphene flakes can be obtained starting from graphite in the same way as it was first isolated and its properties determined back in 2004. The so called micromechanical exfoliation technique renders individual and isolated single crystal monolayer graphene flakes on top of a substrate such as silicon or more specifically silicon with a thin silicon oxide layer on it in order to allow visualizing the individual flakes using a standard optical microscope. These individual and isolated flakes of graphene have been shown to have extremely high charge carrier mobility, high thermal conductivity, excellent mechanical properties, high transparency, flexibility, etc. However, the main problem with this manufacturing method is that it produces a handful of flakes that could be suitable for basic research but not for industrial applications.

The expansion of graphite has been known for a number of years and the first patent related to this material dates back to 1913, US1137373. However, it was not until the late 1960s that a more considerable number of patents related to expanded graphite started to be published, U.S. Pat. No. 3,323,869, GB1186727 and U.S. Pat. No. 4,915,925. Expanded graphite is typically produced using acids and oxidizing agents as intercalating materials followed by an expansion process at high temperatures (around 1000° C.) for short periods of time. However, these processes produce slightly thinner graphite material but not monolayer graphene flakes. More recently, in U.S. Pat. No. 7,550,529 graphite nanoplatelets were produced via the expansion of natural graphite. In this patent, graphite is expanded by first intercalating an acid (sulfuric acid) and an oxidizing agent (nitric acid) followed by an expansion step using microwave or radio frequency (RF) wave treatment. This method produced slightly thinner graphite with considerably lower lateral flake dimensions than the starting graphite material. However, there was no evidence of the production of monolayer graphene flakes. Furthermore, no evidence was provided about the chemical functionalization of graphite in order to obtain covalently functionalised graphene oxide flakes.

In U.S. Pat. No. 8,114,375 patent, intercalated graphite oxide was subjected to two different thermal treatments in order to obtain the expanded material. The starting graphite is intercalated with an acid and an oxidizer prior to the thermal treatments. The first thermal treatment is undertaken at 600° C. while the second one at around 1000° C. As a consequence the final material has an oxygen content of around 5 wt %. Furthermore no evidence of the final thickness of the material is provided and it can be assumed that relatively thick graphite like material is produced using this method.

In U.S. Pat. No. 7,658,901 patent, thermally exfoliated graphite oxide is produced where it is demonstrated that the starting graphite material has been subjected to a certain chemical functionalization especially prior to the high temperature treatment. This patent relates to the production of thermally exfoliated graphite oxide where the graphite is intercalated with an acid and an oxidant followed by a thermal treatment at high temperatures up to 2000° C. However, after the thermal treatment most of the functionality disappears, almost all the oxygen containing groups are eliminated due to the high temperature treatment, which moreover is very expensive in terms of thermal energy.

In yet another patent U.S. Pat. No. 8,524,067 graphite was intercalated with carboxylic acids (formic or acetic acids) followed by an electrochemical reaction, thermal treatment and mechanical shearing. The process could be repeated several times until the thickness of the flakes was <30 nm. No clear evidence was provided about the amount and yield of monolayer flakes that could be obtained using this process. In addition due to the many processing steps this method could be deemed quite inefficient. No covalent functionalization of the graphite flakes was achieved.

Similarly in U.S. Pat. No. 8,747,623, graphite was intercalated with an acid and an oxidizing agent and immediately it was treated to microwave irradiation. Again no clear evidence was provided about the amount and yield of monolayer flakes that could be obtained using this process. The oxygen content of the flakes was below 5 wt %.

In WO 2010/042912 patent application, the preparation of graphite oxide is explained. Graphite is oxidized in concentrated sulphuric acid, sodium nitrate and potassium permanganate. Once the reaction is completed the mixture is purified in order to obtain the graphite oxide material. Since this document does not mention any thickness for the produced flakes and no exfoliation step is disclosed, it can be assumed that no graphene oxide monolayer flakes can be produced using this method.

There are other reports related to the production of graphite oxide that date back to 1898 where Staudenmaier published a method to produce graphite oxide starting from nitric acid, sulfuric acid and potassium chlorate. However, it had clear disadvantages such as long reaction times (1 week) and the use of explosive reactants. In addition, no monolayer flakes were isolated using this method, only thick graphite oxide flakes were obtained.

In 1958, Hummers and Offeman reported a method to synthesize graphite oxide using concentrated sulfuric acid, sodium nitrate and potassium permanganate. They added sodium nitrate instead of nitric acid in order to avoid the use of a very corrosive acid. Again no monolayer flakes of graphene oxide were isolated and characterized using this method, only thick graphite oxide fakes were achieved.

In U.S. Pat. No. 6,596,396 patent a manufacturing process based on a modified Hummers's method is presented in order to synthesize thin particles of graphite oxide. The described method uses concentrated sulfuric acid, sodium nitrate and potassium permanganate to produce graphite oxide. The reaction to produce of graphite oxide takes more than five days and therefore it is not a very cost-effective process. In addition, these 5 days do not include the purification process. Again the sodium nitrate is considered as a crucial component in order to obtain the graphite oxide.

The purification process is also extremely long in the U.S. Pat. No. 6,596,396 patent, where the graphite oxide dispersions are left to settle for over a day several times, extending considerably the purification process time. In addition acidic and oxygen peroxide containing mixtures are used in the cleaning procedure making the process environmentally unfriendly.

More recently, Marcano et. al. (ACS Nano 2010, 4 (8) 4806-4814) described a new method for the synthesis of graphene oxide based on a modified Hummers method. In this article the sodium nitrate is replaced by phosphoric acid and the amount of potassium permanganate amount is duplicated.

Other manufacturing methods that use graphite as a starting material are based on the so-called liquid phase exfoliation technique. In this case there is no prior oxidation step of the graphite and the exfoliation of the flakes is generally obtained via ultrasonic waves. The exfoliation of graphite is undertaken in liquid media either in the water containing surfactants or in thermodynamically favourable solvents for graphite.

In U.S. Pat. No. 7,824,651 graphite is dispersed in a liquid medium containing a surfactant or dispersing agent and subjected to ultrasonication. The thickness of the flakes after the exfoliation process is claimed to be below 100 nm however, no evidence is provided about the efficiency and the real thickness of the produced flakes. No oxidation step is undertaken therefore no covalent functionalization of the graphite flakes.

WO 2014/140324 A1 discloses a process for exfoliating untreated 3-dimensional material to produce a 2-dimensional material by using a high shear mixer.

The main drawback with direct exfoliation techniques of graphite in liquid mediums is their extremely low yield and very small quantities of monolayer flakes that are obtained.

In the US 2013/0302593 patent application a similar procedure is mentioned to exfoliate MoS2, MoSe2, WS2, BN and similar type of materials. In this case the exfoliation is undertaken in water-surfactant solutions using ultrasound and centrifugal force to exfoliate them.

SUMMARY

For overcoming the low yields and long times for obtaining graphene oxide of the prior art methods, the present invention provides for a method for obtaining graphene oxide comprising the steps of:
  a) adding an acid and a salt to graphite for obtaining a graphite oxide;
  b) exfoliating the graphite oxide by mixing it;
  characterized in that the steps a) and b) are carried out simultaneously in a high shear mixer;

Therefore, the present invention is related to the use of high shear mixing during the reaction of oxidation of graphite to produce monolayer graphene oxide flakes. The high shear mixing provides an excellent intermixing between the reactants and the starting graphite material, thus producing monolayer graphene oxide flakes during the reaction stage. In addition this high shear mixing shortens considerably the oxidation reaction times down to minutes.

A high-shear mixer uses a rotating impeller or high-speed rotor powered by an electric motor which creates flow and shear. In a high shear mixer, the speed of the fluid at the outside diameter of the rotor is higher than the velocity at the center of the rotor, and it is this velocity difference that creates shear. A stationary component is used in combination with the rotor, and is referred to as the stator. The stator creates a close-clearance gap between the rotor and itself and forms an extremely high-shear zone for the material as it exits the rotor.

The inventors have found that the claimed method allows for a:
High functionalization level of graphene oxide
High monolayer content (>99.8%)
Short production times
High total production yield
Environmentally friendliness
Easily up scalable production method The proposed process is not limited to using natural graphite, synthetic graphite or other carbon containing materials can be used as starting material.

The proposed process is not obvious for a person skilled in the art, since those skilled in the art believed that exfoliation into monolayer flakes did not occur during the reaction step, sodium nitrate or nitric acid or phosphoric acid was required as a reactant in order to obtain a high graphite oxide conversion, and then ultrasonication was required in order to obtain the monolayer flakes after the purification process.

Preferably, the acid is sulphuric acid and the salt is potassium permanganate.

Most preferably, no other components are added in steps a) or b). Specifically, according to a preferred embodiment, no sodium nitrate is used in the present invention.

The authors of the present patents surprisingly realized that the elimination of this compound led to much higher reaction yields. Therefore, unlike the believe of the person skilled in the art that nitric acid or sodium nitrate are required in order to obtain a high conversion of graphite into graphite oxide, the inventors found that the role of the sodium nitrate or nitric acid is not as crucial as first thought when a high shear mixer is used.

In addition, in the process proposed in the present invention, the graphite oxidation reaction takes only 60 minutes to complete rather than the more than 7,200 minutes (five days) presented in the U.S. Pat. No. 6,596,396 patent. Therefore there is a 99% reduction in reaction time. Furthermore, due to the fact that only sulphuric acid and potassium permanganate are used to oxidise the graphite it is cheaper, faster and more environmentally friendly.

Moreover, in the present invention only water is used for the cleaning of the reaction mixtures making it greener and at the same time much shorter process.

Finally, the method comprises the further step of:
  c) carrying out a second mixing step in the high shear mixer once the purification is completed;

Therefore, once the reaction is complete the material is purified and a second high shear mixing is performed in order to obtain a very high percentage (>99.8%) of monolayer graphene oxide flakes.

BRIEF DESCRIPTION OF THE DRAWINGS

To complete the description and in order to provide for a better understanding of the invention, a set of drawings is provided. Said drawings form an integral part of the description and illustrate an embodiment of the invention, which should not be interpreted as restricting the scope of the invention, but just as an example of how the invention can be carried out. The drawings comprise the following figures.

DETAILED DESCRIPTION OF THE PREFERRED EMBODIMENTS

The present invention relates to a method for obtaining graphene oxide comprising the steps of:
  a) adding an acid and a salt to graphite for obtaining a graphite oxide;
  b) exfoliating the graphite oxide by mixing it;
  characterised in that the steps a) and b) are carried out simultaneously in a high shear mixer.

For implementing the present invention, the inventors used a Dispermat CN30F2 high shear mixer, provided with a mixer disc.

Before the present invention, the most common scenario was not to use any mixing at all during this type of reactions and occasionally magnetic stirrers or mechanical overhead stirrers were used. Magnetic stirrers and mechanical overhead stirrers both have a limited mixing power, specially the magnetic stirrers while the maximum velocity of mechanical overhead stirrers is usually around 1500 rpm. In contrast, for the case of the high shear mixer the velocity can be increased up to 5000-10000 rpm. This makes the mixture much more homogeneous, thus increasing the yield. On the other hand, due to the shear force the material gets exfoliated at the same time that the oxidation reaction is taking place.

When comparing both methods it can be concluded that the high shear mixer is clearly more effective from the point of view of time and yield, even for similar rotation speeds.

TABLE 1

Optimised conditions for mixing the reactants.

| Conditions | Tool | Parameters rpm/energy | t (min) | Product yield (%) |
| --- | --- | --- | --- | --- |
| 1 | High shear mixer | 1000 | 80 | 92 |
| 2 | High shear mixer | 3000 | 60 | 89 |
| 3 | High shear mixer | 5000 | 40 | 94 |
| 4 | High shear mixer | 8000 | 30 | 90 |
| 5 | Mechanical stirrer | 1000 | 180 | 70 |
| 6 | Mechanical stirrer | 1800 | 100 | 75 |

Process Reproducibility

From an industrial perspective, a production process not only needs to be cost effective but the reproducibility is also an extremely crucial factor. In this context the inventors have assessed the reproducibility of the inventive manufacturing process by analyzing the produced graphene oxide material from different batches. The elemental analysis was used to determine the oxidation level of the produced graphene oxide flakes. As it can be observed, the oxidation level is almost identical for all the manufactured batches.

In the following table the percentage of oxidation measured by elemental analysis is described. The achieved functionalisation or oxidation level is between 43 to 45% thus showing a very good reproducibility.

TABLE 2

Oxygen content determined using elemental analysis.

| Batch number | % O |
| --- | --- |
| 1 | 44.83 |
| 2 | 44.95 |
| 3 | 45.02 |
| 4 | 43.05 |
| 5 | 43.84 |
| 6 | 44.95 |
| 7 | 45.01 |
| 8 | 43.00 |

Figure 1:
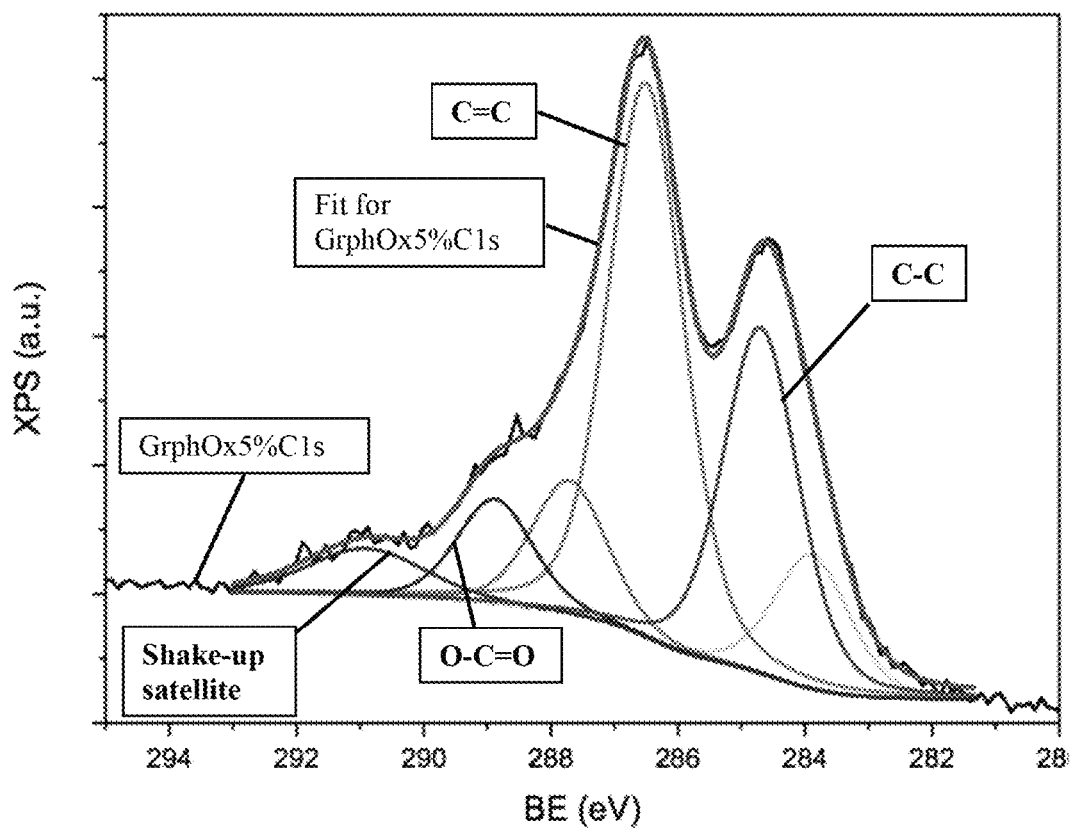
FIG. 1 is a XPS spectrum of graphene oxide from batch 2.

In order to further demonstrate the incorporation of the oxygen functionality and prove that graphene oxide has been produced the XPS (X-Ray photoelectron spectroscopy) spectra were recorded, as shown in FIG. 1. From the XPS it can be concluded that the starting graphite material has been oxidised and that oxygen functionalities have been covalently bonded onto the $sp^2$ honeycomb structure of graphene.

Comparison of Ultrasonic Treatment and High Shear Mixing

The most established procedure in the prior art to produce monolayer graphene oxide flakes is the ultrasonic treatment of the purified graphite oxide material. The ultrasonic treatment exfoliates the graphite oxide into individual monolayer graphene oxide flakes. However using high concentration dispersions (2-4 g/L) very long exfoliation times are needed in order to get a high monolayer graphene oxide content. If we compare the ultrasonic treatment with the one undertaken in this invention, it can be clearly concluded that the proposed method is much faster, therefore more cost effective and produces a much higher yield of monolayer flakes.

Figure 2:
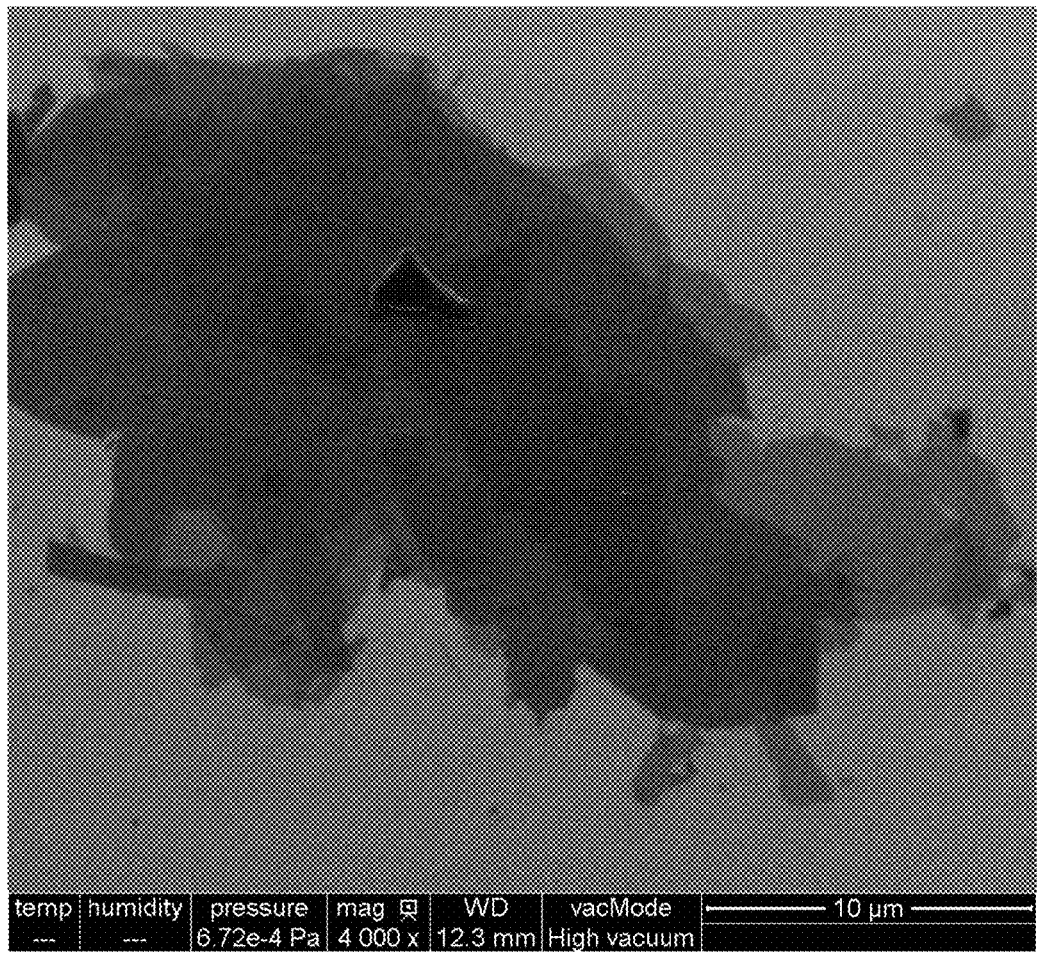
FIG. 2 shows the results after ultrasonication treatment for 15 minutes of the purified graphite oxide.
Figure 3:
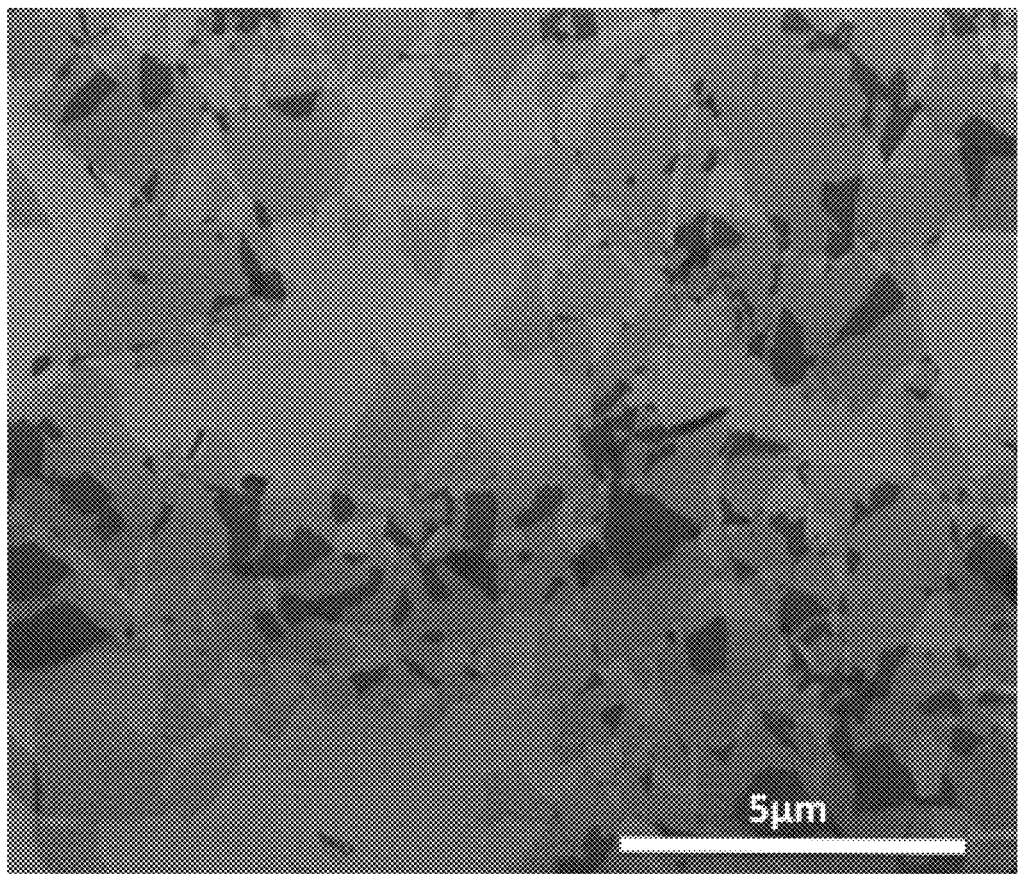
FIG. 3 shows the monolayer flakes produced using a process according to the disclosure and 15 minutes of high shear mixing treatment on the graphene oxide material of the present invention.

FIG. 2 shows a SEM (scanning electron microscope) image of the graphene oxide flakes obtained using a modified Hummers's method (sulphuric acid, sodium nitrate and potassium permanganate) followed by purification of the produced graphite oxide and subsequent ultrasonic treatment. On the other hand FIG. 3 shows a SEM image of the graphene oxide flakes obtained using the current invention. Sulphuric acid and potassium permanganate, without sodium nitrate) were added onto graphite under high shear mixing followed by purification of the graphene oxide material and a second high shear mixing in order to obtain a higher yield of monolayer flakes. 15 minutes of exfoliation time are sufficient to obtain much better results in terms of monolayer content and flake size distribution.

On the contrary, with 15 minutes of ultra sonication treatment there are still huge agglomerates present and the percentage of monolayer graphene oxide flakes is low, as shown in FIG. 2. An ultrasonic treatment of up to 5 h is required in order to obtain comparable results to our process. In addition the extended ultrasonic treatment tends to damage the flake size due to the high energy that is required to delaminate the flakes.

Monolayer Content in Graphene Oxide Dispersions

Figure 4A:
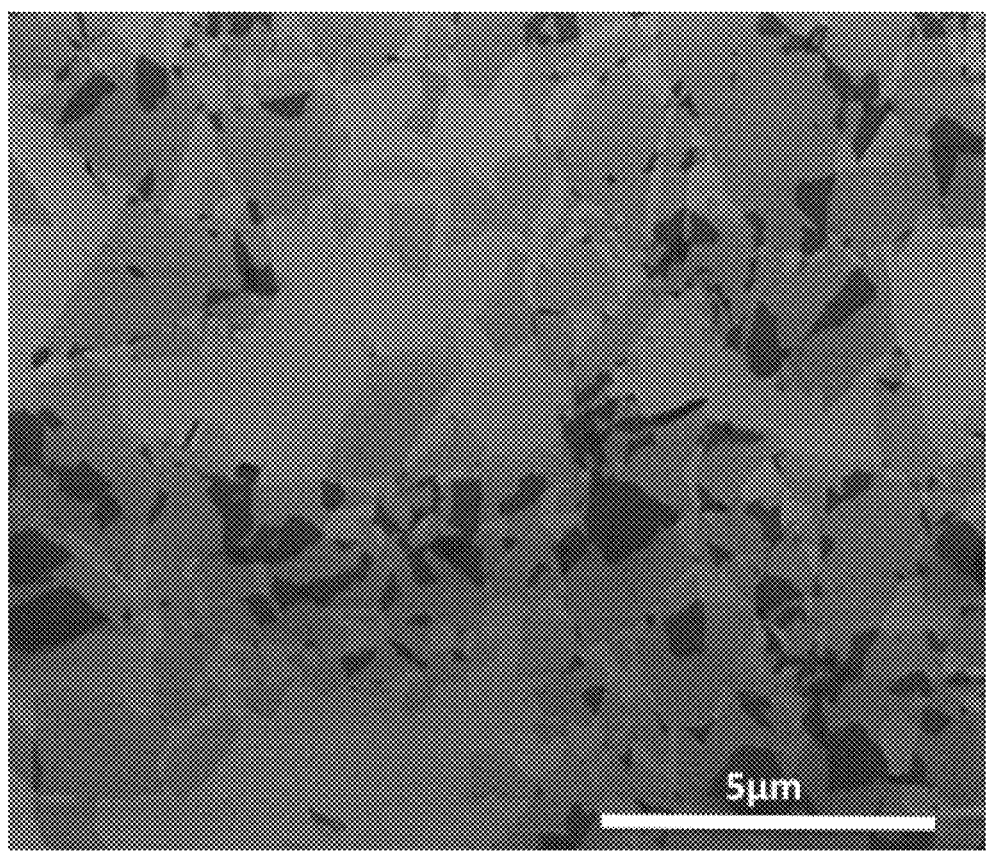
FIGS. 4A and 4B show the graphene oxide flakes obtained using the process of the present invention. Monolayer content is higher than 98%.
Figure 4B:
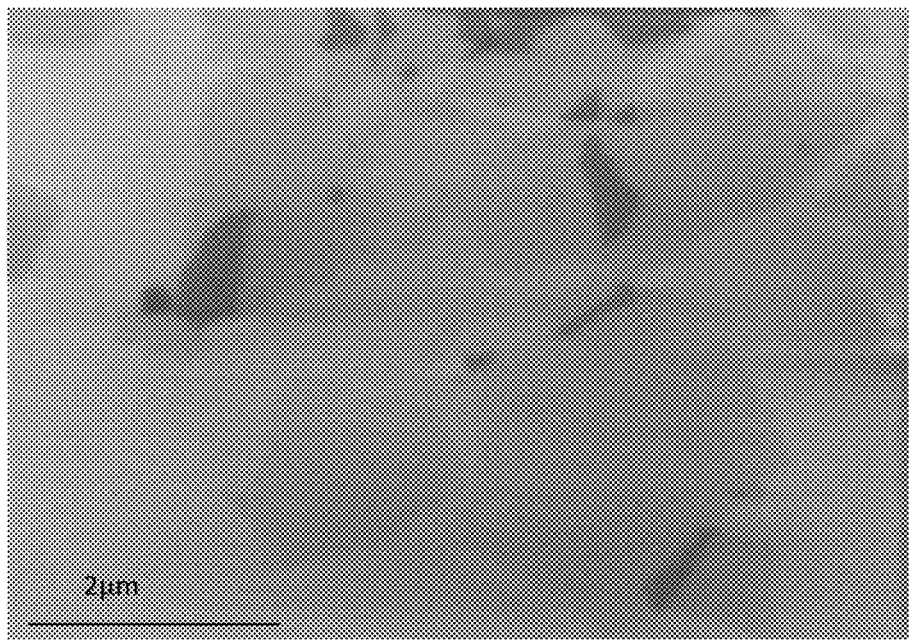

In FIGS. 4A and 4B the high monolayer content of the dispersions after the high shear mixing treatment can be seen. It is clear that the 98% of the graphene oxide flakes produced using the inventive process are monolayer. Actually, the darker areas correspond to flakes that are in contact with each other and not bilayer flakes.

Figure 5:
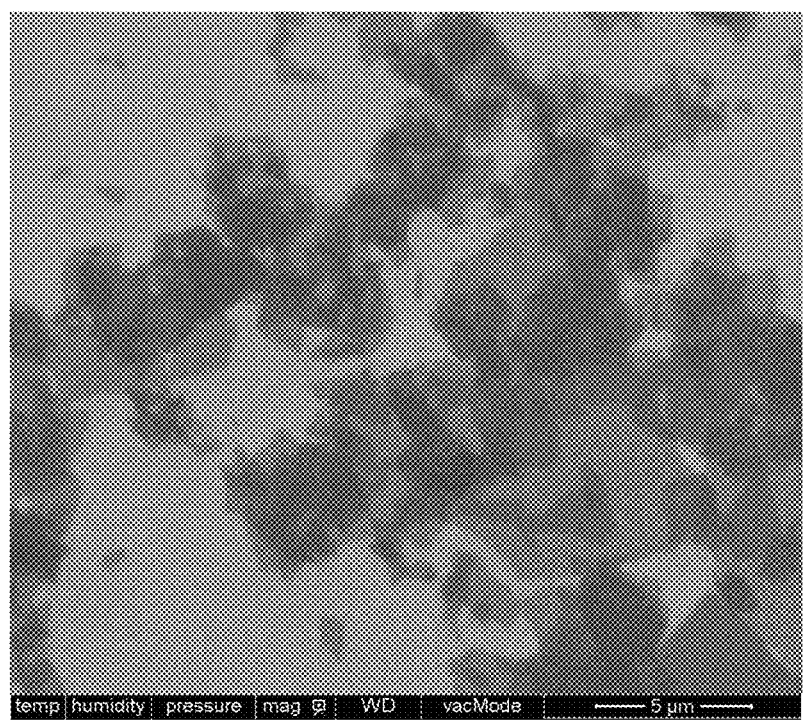
FIG. 5 shows the graphene oxide flakes obtained without using the high shear mixing process during the oxidation reaction or exfoliation. Monolayer content is lower than 50%.

For comparison, an SME image (FIG. 5) of the flake size distribution where the high shear mixer was not used during the reaction or exfoliation process can be observed. The monolayer % is clearly much lower.

Monolayer Graphene Oxide Flake

Figure 6:
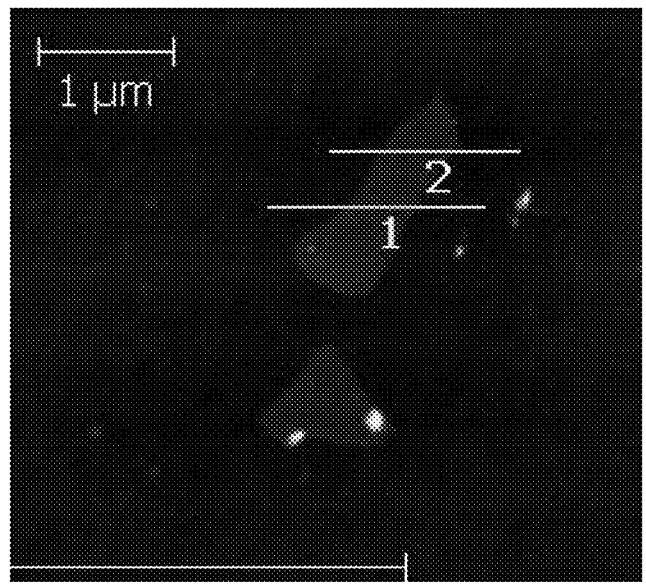
FIGS. 6 and 7 show the AFM thickness profile for a monolayer graphene oxide flake produced using the process covered in this patent.
Figure 7:
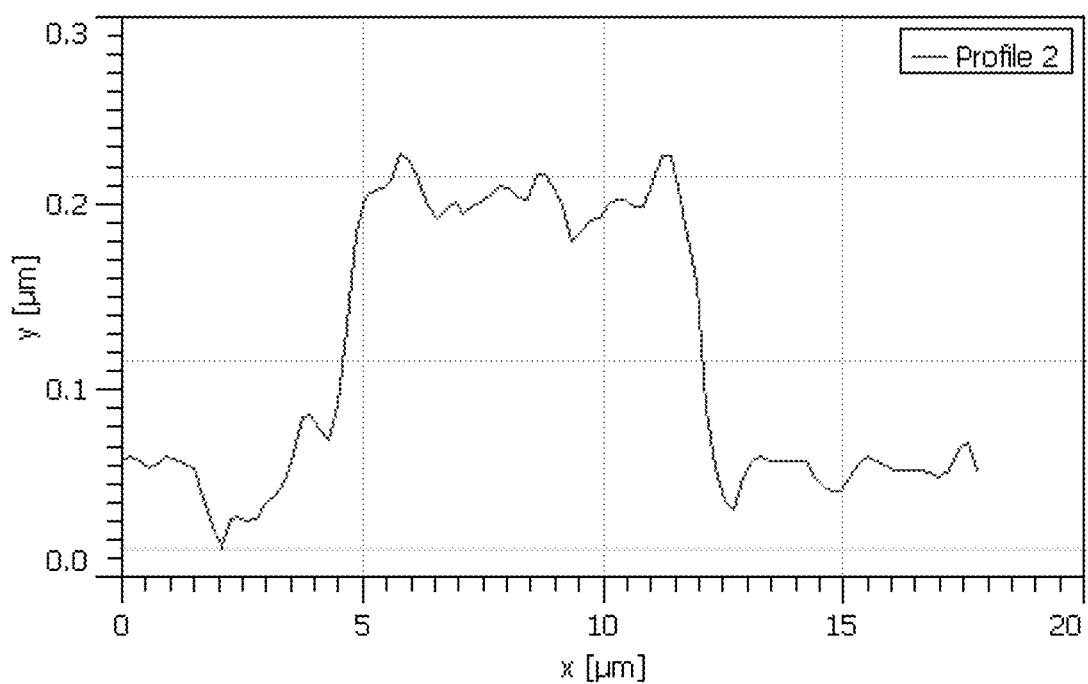
Figure 8:
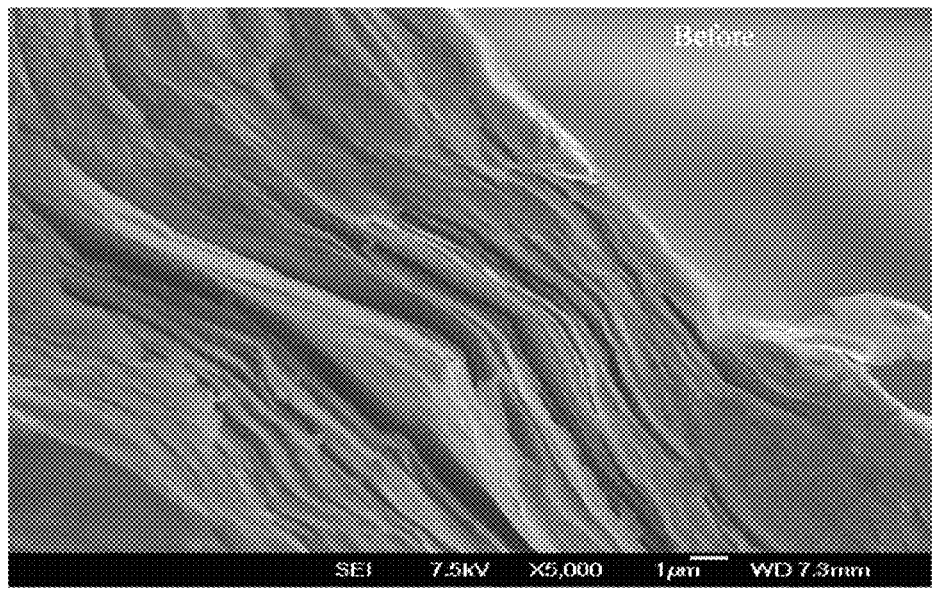
FIGS. 8 and 9 are SEM images of the graphene oxide paper before and after the 1000° C. treatment respectively.
Figure 9:
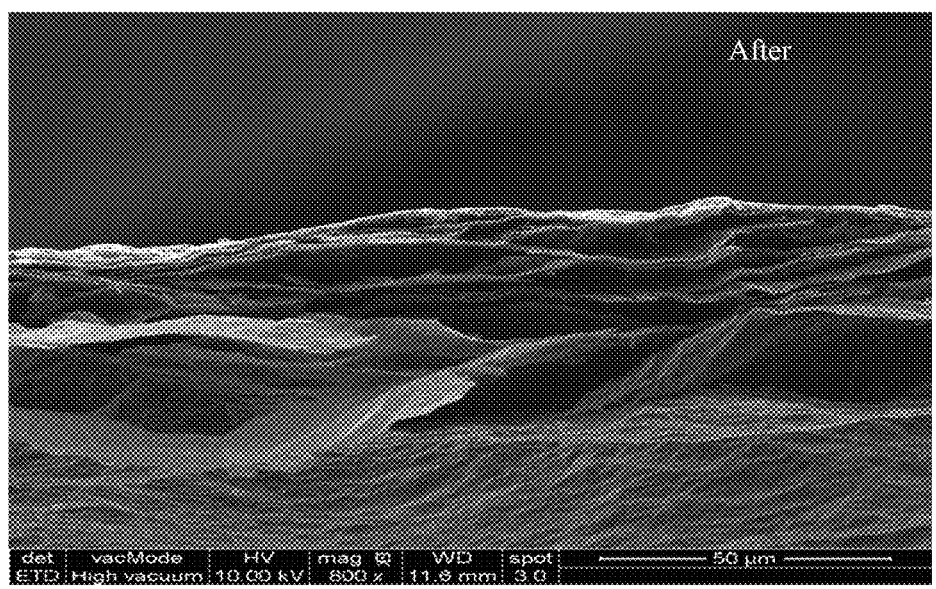

An AFM (atomic force microscopy) is used in order to prove the thickness of the produced monolayer graphene oxide flakes. It can be observed in FIGS. 6 and 7 that the flake thickness is a few nanometers, exactly the thickness reported in the literature for graphene oxide monolayer flakes.

Preparation of Graphene Oxide Films—Thermal Conductivity Measurements

With the graphene oxide obtained by the method of this invention, films can be prepared by casting high concentrated dispersions into a mould and eliminating the water by evaporation. After drying, this graphene oxide papers were easily detached from the mould and small pieces were treated at high temperatures (300° C., 600° C., 1000° C.) in order to measure the thermal conductivity using the laser flash technique. As it can be observed in the table 3, the thermal conductivity increased 15 times when the paper was treated to 1000° C.

This material can be used as a filler in composites for enhancing the thermal conductivity of different matrix materials. The anisotropic behaviour of the material is an added advantage for this kind of applications where the heat needs to be transported in just one of the directions.

TABLE 3

Thermal conductivity of thermally treated graphene oxide papers.

| Material | κ (W/mK) In-plane | κ (W/mK) cross-plane |
|---|---|---|
| GO paper no treatment | 3.09 | 0.165 |
| GO paper 300° C. | 13.6 | 0.032 |
| GO paper 600° C. | 25.6 | 0.039 |
| GO paper 1000° C. | 62.6 | 0.022 |

In summary, the present invention covers the production of monolayer graphene oxide flakes in a cost effective manner, with a high yield of monolayer flakes and excellent oxidation percentages.

It was surprising to obtain monolayer graphene oxide flakes already during the oxidizing reaction step by using high shear mixing during the reaction process. On the other hand, once the purification is completed a second high shear mixing step was performed for a few minutes in order to obtain more than 99.8% of monolayer graphene oxide flakes.

Furthermore, the proposed process produces a graphene oxide material in a reproducible and more cost effective manner suitable for industrial applications.

In this text, the term "comprises" and its derivations (such as "comprising", etc.) should not be understood in an excluding sense, that is, these terms should not be interpreted as excluding the possibility that what is described and defined may include further elements.

The invention is obviously not limited to the specific embodiments described herein, but also encompasses any variations that may be considered by any person skilled in the art within the general scope of the invention as defined in the claims.

What is claimed is:

1. A method for obtaining graphene oxide comprising:
   adding an acid and a salt to graphite for obtaining a graphite oxide; and
   exfoliating the graphite oxide by mixing it;
   wherein the adding and exfoliating are carried out simultaneously in a high shear mixer.

2. The method of claim 1, wherein the acid is sulphuric acid and the salt is potassium permanganate.

3. The method of claim 1, wherein no other components are added in the adding or exfoliating.

4. The method of claim 1, further comprising:
   carrying out a second mixing in the high shear mixer once a purification has been completed.

* * * * *